Aug. 31, 1926.

F. W. DUCATE

HEADLIGHT

Filed Oct. 18, 1924

1,598,563

Inventor
Fred W. Ducate

By F. J. O'Brien

Attorney

Patented Aug. 31, 1926.

1,598,563

UNITED STATES PATENT OFFICE.

FRED W. DUCATE, OF DENVER, COLORADO, ASSIGNOR OF ONE-HALF TO LEROY CURTICE TALBOTT, OF DENVER, COLORADO.

HEADLIGHT.

Application filed October 18, 1924. Serial No. 744,396.

This invention relates to improvements in headlights for automobile vehicles.

Since our automobiles have become so numerous, we have been confronted with the difficult problem of securing satisfactory illumination of the roads for night driving without interfering with the vision of approaching drivers. When the automobiles were scarce, the problem of road illumination was simple because machines moving in the other direction were met so seldom that the headlights could be dimmed whenever machines met. Now, however, it often happens that there are solid processions of automobiles miles long traveling in opposite directions, which make it necessary that the lights should be so designed that dimming is unnecesary, and which will give good road illumination without objectionable glare.

In order to obtain a glareless light, it is necesary to so construct the lamps that no direct rays from the lamp can strike the eyes of approaching drivers. The lamp must also be designed that very little, and, if possible, no reflected light shall emerge in a direction which will interfere with traffic coming in the opposite direction.

I have found that by a peculiar construction of the lamp, which will presently be described, I can obtain satisfactory illumination of the road without causing annoyance to the drivers of approaching cars.

My invention can be most clearly described and will be most readily understood when reference is had to the accompanying drawing, in which the preferred embodiment thereof is illustrated, and in which:—

Figure 1:
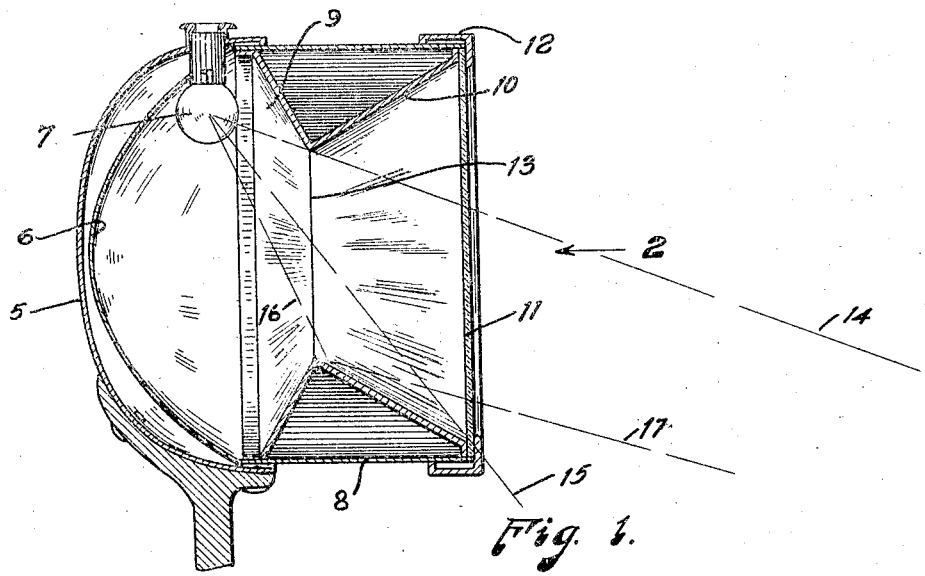
Figure 2:
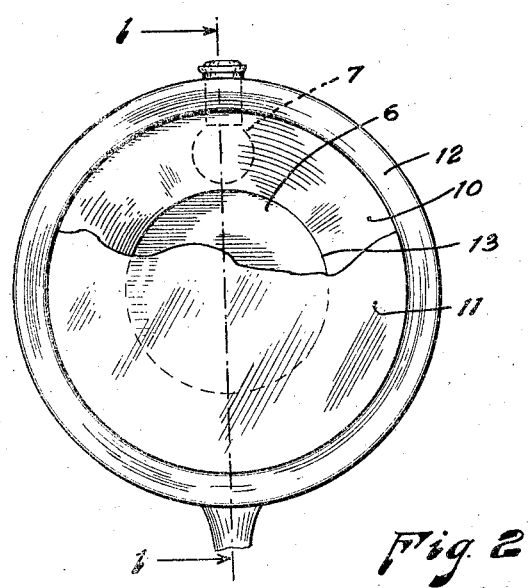

Fig. 1 is a vertical longitudinal section of my improved headlight, taken on line 1—1 Fig. 2; and Fig. 2 is a front elevation of my headlight looking in the direction of arrow 2, Fig. 1.

My headlight consists of a housing 5, which encloses a reflector 6 of ordinary construction. The lamp 7 instead of being located at the focal point and on the axis of the reflector is located near the top thereof in the position shown in the drawing. Secured to the front end of the housing 5 and directly in front of the reflector is a cylindrical housing 8 within which is placed an hourglass-shaped reflector comprising two conical reflecting surfaces 9 and 10. A lens 11 closes the front of the lamp and is held in place by means of a ring 12. It will be noticed that the reflector surfaces 9 and 10 form the sides of truncated cones and have their edges joined on line 13. It is apparent from the drawing that the lamp 7 is invisible from a point in front of the headlight and located above the level of the lamp and can only be seen if the eye is located on or below the line 14. Direct light from the lamp will therefore never cause a glare to an approaching driver. Any direct light that emerges from the headlight will be confined to a cone represented by lines 14 and 15 and will strike the road. The light rays between lines 15 and 16 will strike the surface of the reflector 10 and be projected outwardly and downwardly through the space between lines 15 and 17. The light that strikes the reflectors 6 and 9 is reflected in various ways and produces an effect as if the entire reflector 6 were luminous. This causes a diffused and soft, but highly efficient beam of light to be projected, which spreads over a large surface of the road, but which does not cause any blinding glare.

The angular relationship of the reflectors 9 and 19 may be varied so as to produce different light distribution, but an angle of substantially 90 degrees has been found satisfactory.

Having now described my invention, what I claim as new is:—

A headlight comprising a concave reflector, a truncated conical reflector located in front thereof the base of said conical reflector having substantially the same diameter as the concave reflector and secured to the latter, said conical reflector projecting forwardly from the concave reflector, a second truncated conical reflector having its inner and smaller edge connected to the outer and smaller edge of the first conical reflector so as to form a compound reflector having a central opening smaller in diameter than the other portions of the reflector and a source of light located at the angle between the concave and the adjacent conical reflector.

In testimony whereof I affix my signature.

FRED W. DUCATE.